US010619560B2

(12) United States Patent
Igarashi

(10) Patent No.: US 10,619,560 B2
(45) Date of Patent: Apr. 14, 2020

(54) WASTEGATE VALVE OF TURBOCHARGER

(71) Applicant: TOYOTA JIDOSHA KABUSHIKI KAISHA, Toyota-shi (JP)

(72) Inventor: Osamu Igarashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/234,652

(22) Filed: Dec. 28, 2018

(65) Prior Publication Data
US 2019/0211744 A1 Jul. 11, 2019

(30) Foreign Application Priority Data
Jan. 10, 2018 (JP) .................................. 2018-002043

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F05D 2220/40* (2013.01); *F05D 2230/642* (2013.01); *F05D 2250/232* (2013.01); *F05D 2250/43* (2013.01); *F05D 2260/38* (2013.01); *F05D 2260/52* (2013.01)

(58) Field of Classification Search
CPC .................................................. F02B 37/186
USPC ....................................................... 251/186
See application file for complete search history.

(56) References Cited

U.S. PATENT DOCUMENTS

| 9,316,148 | B1 * | 4/2016 | Hastings | F01D 17/105 |
|---|---|---|---|---|
| 9,464,565 | B2 * | 10/2016 | Yamaguchi | F02B 37/183 |
| 9,631,628 | B2 * | 4/2017 | Takahashi | F02B 37/183 |
| 10,508,593 | B2 * | 12/2019 | Niedens | F02B 37/186 |
| 2012/0055154 | A1 * | 3/2012 | Ebert | F01D 17/105 60/602 |
| 2012/0317975 | A1 * | 12/2012 | Schoenherr | F02B 37/183 60/602 |
| 2014/0366530 | A1 * | 12/2014 | Murayama | F02B 37/183 60/602 |
| 2015/0118027 | A1 * | 4/2015 | Zieboli | F02B 37/186 415/145 |
| 2015/0125272 | A1 * | 5/2015 | Mack | F01D 17/105 415/145 |

(Continued)

FOREIGN PATENT DOCUMENTS

JP 2015-197068 11/2015
WO WO 2010/135104 A2 11/2010

*Primary Examiner* — Umashankar Venkatesan
(74) *Attorney, Agent, or Firm* — Oblon, McClelland, Maier & Neustadt, L.L.P.

(57) ABSTRACT

A wastegate valve of a turbocharger includes a swing arm that includes a shaft and a lever including an insertion hole, a valve body including a valve shaft inserted into the insertion hole and a valve plate arranged on an end of the valve shaft, a support plate fixed to a portion of the valve shaft protruding out of the insertion hole, and an elastic member arranged between the support plate and the lever or the lever and the valve plate. The elastic member includes a ring, claws curved toward a first side in an axial direction of the ring, and a projection projecting from the ring toward the first side. The projection length of the projection is smaller than a distance obtained by subtracting the thickness of the lever from the distance between the valve plate and the support plate in the axial direction of the valve shaft.

6 Claims, 6 Drawing Sheets

(56) References Cited

U.S. PATENT DOCUMENTS

| | | | |
|---|---|---|---|
| 2015/0147162 A1* | 5/2015 | Stilgenbauer | F02B 37/186 |
| | | | 415/145 |
| 2016/0178028 A1* | 6/2016 | Lummer | F02B 37/186 |
| | | | 251/321 |
| 2017/0122192 A1* | 5/2017 | Uneura | F02B 37/186 |
| 2018/0230848 A1* | 8/2018 | Iwata | F01D 17/105 |
| 2019/0003376 A1* | 1/2019 | Schawer | F02B 37/186 |

* cited by examiner

WASTEGATE VALVE OF TURBOCHARGER

BACKGROUND

The present disclosure relates to a wastegate valve of a turbocharger.

Japanese Laid-Open Patent Publication No. 2015-197068 discloses a turbocharger including a turbine housing and a turbine wheel accommodated in the turbine housing. The turbine housing includes a wastegate port formed to bypass the turbine wheel. A wastegate valve inside the turbine housing opens and closes the wastegate port.

The wastegate valve includes a swing arm, and the swing arm is pivotally supported by the turbine housing. The swing arm includes a shaft pivotally supported by the turbine housing and a lever extending outward from an end of the shaft in a radial direction of the shaft. The lever of the swing arm includes an insertion hole. A valve body that closes the wastegate port is attached to the lever in a manner tiltable relative to the lever. Specifically, the valve body is attached to the lever such that the center axis of the valve body is allowed to be tilted relative to the center axis of the insertion hole of the lever. The valve body includes a valve shaft inserted into the insertion hole of the lever and a valve plate arranged on an end of the valve shaft. A surface of the valve plate at a side opposite to the lever is configured to abut against an open end of the wastegate port located in an inner surface of the turbine housing so that the valve plate closes the wastegate port. An end of the valve shaft at a side opposite to the valve plate protrudes from the insertion hole, and a support plate is secured to the portion of the valve shaft protruding from the insertion hole.

Further, a substantially flat elastic member is arranged between the lever and the support plate. The elastic member includes a ring and a plurality of claws protruding inward from the inner circumferential edge of the ring in the radial direction of the ring and curved in the axial direction of the ring. The valve shaft of the valve body is inserted into a center hole in the ring of the elastic member. The ring of the elastic member abuts on one of the lever and the support plate and the distal ends of the claws of the elastic member abut on the other one of the lever and the support plate so that the elastic member biases the valve body in the axial direction of the valve shaft. To open or close the wastegate valve, the claws of the elastic member are elastically deformed to tilt the valve body relative to the lever such that the valve plate of the valve body extends in correspondence with a wall surface of the turbine housing.

The wastegate valve opens and closes the wastegate port while being exposed to the high-temperature exhaust gas drawn into the turbine housing. The claws of the elastic member repeatedly undergo elastic deformation in such a high-temperature environment. Thus, the claws of the elastic member are susceptible to wear that deteriorates the resiliency of the claws. If the claws of the elastic member are worn out and the curvature of the claws becomes small, the entire elastic member will be reduced in thickness and become loose in the wastegate valve. If the wastegate valve over-loosens, the wastegate valve may generate noise when the wastegate valve opens or closes or when exhaust gas strikes the wastegate valve.

SUMMARY

One aspect of the disclosure provides a wastegate valve of a turbocharger, wherein the turbocharger includes a turbine housing that includes a wastegate port, the wastegate valve including a swing arm that includes a shaft configured to be pivotally supported by the turbine housing and a lever extending outward from an end of the shaft in a radial direction of the shaft and including an insertion hole; a valve body attached to the swing arm, wherein the valve body includes a valve shaft inserted into the insertion hole and a valve plate arranged on an end of the valve shaft, and the valve plate is configured to abut on an open end of the wastegate port in an inner surface of the turbine housing to close the wastegate port; a support plate fixed to a portion of the valve shaft protruding out of the insertion hole at a side opposite to the valve plate; and an elastic member arranged between the support plate and the lever or the lever and the valve plate and configured to bias the valve body in an axial direction of the valve shaft, wherein the elastic member includes a ring into which the valve shaft is inserted, a plurality of claws protruding from the ring in a radial direction of the ring and curved toward a first side in an axial direction of the ring, and a projection projecting from the ring toward the first side in the axial direction of the ring, wherein a length from a surface of the ring located at a second side in the axial direction of the ring to a distal end of the projection is referred to as a projection length of the projection, and the projection length of the projection is smaller than a distance obtained by subtracting a thickness of the lever from a distance between the valve plate and the support plate in the axial direction of the valve shaft.

Other aspects and advantages of the embodiments will become apparent from the following description, taken in conjunction with the accompanying drawings, illustrating by way of example the principles of the invention.

BRIEF DESCRIPTION OF THE DRAWINGS

The present disclosure, together with objects and advantages thereof, may best be understood by reference to the following description of the present embodiments together with the accompanying drawings in which.

DETAILED DESCRIPTION

One embodiment according to the present disclosure will now be described with reference to FIGS. 1 to 5.

Figure 1:
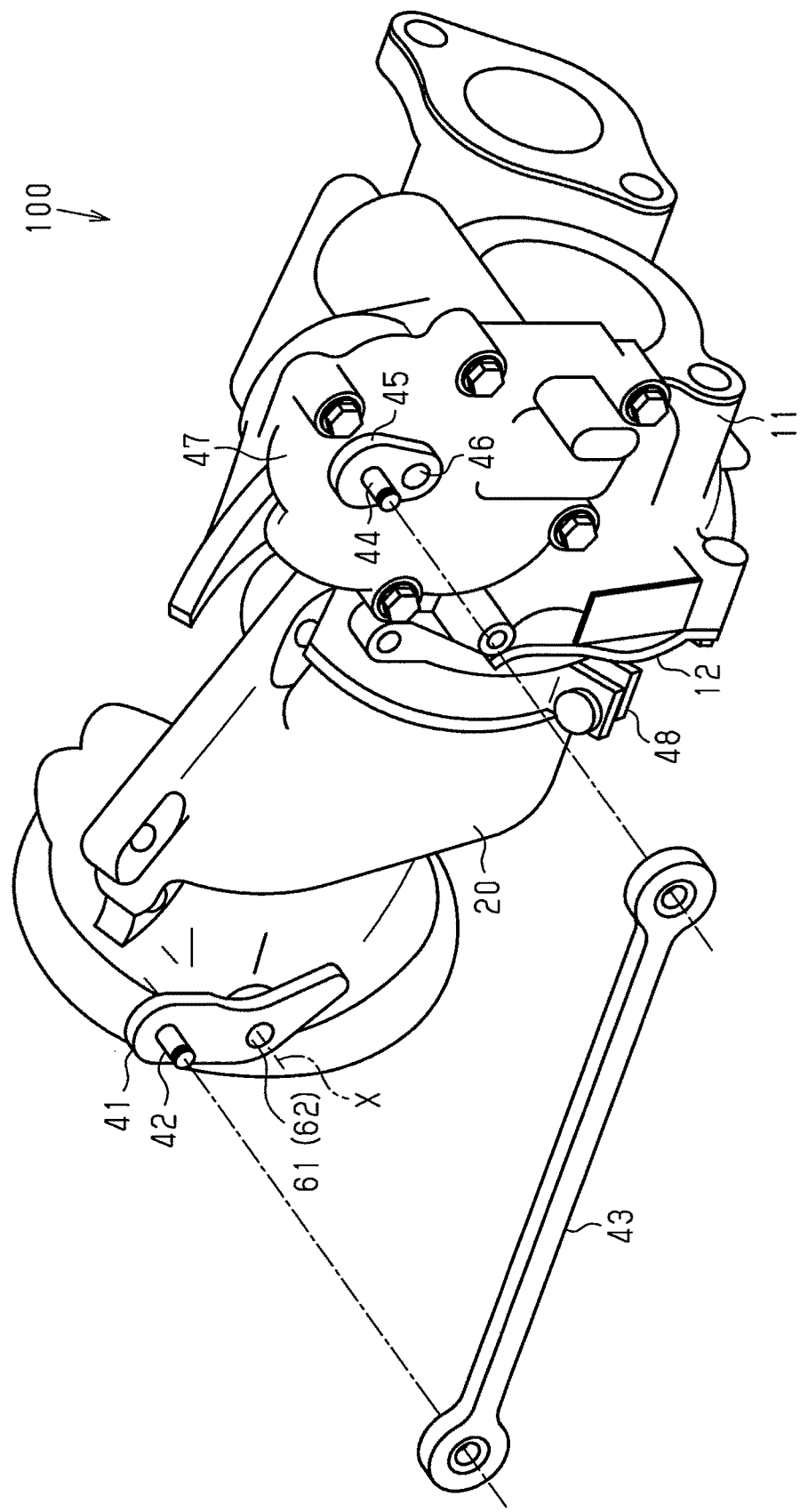
FIG. 1 is a perspective view of a turbocharger according to one embodiment.

As shown in FIG. 1, a turbocharger 100 includes a compressor housing 11 attached to an intake passage of an internal combustion engine, a turbine housing 20 attached to an exhaust passage of the internal combustion engine, and a bearing housing 12 that connects the compressor housing 11 to the turbine housing 20. The bearing housing 12 is fixed to the compressor housing 11 by bolts (not shown). The turbine housing 20 is fixed to the bearing housing 12 by a clamp 48.

Figure 2:
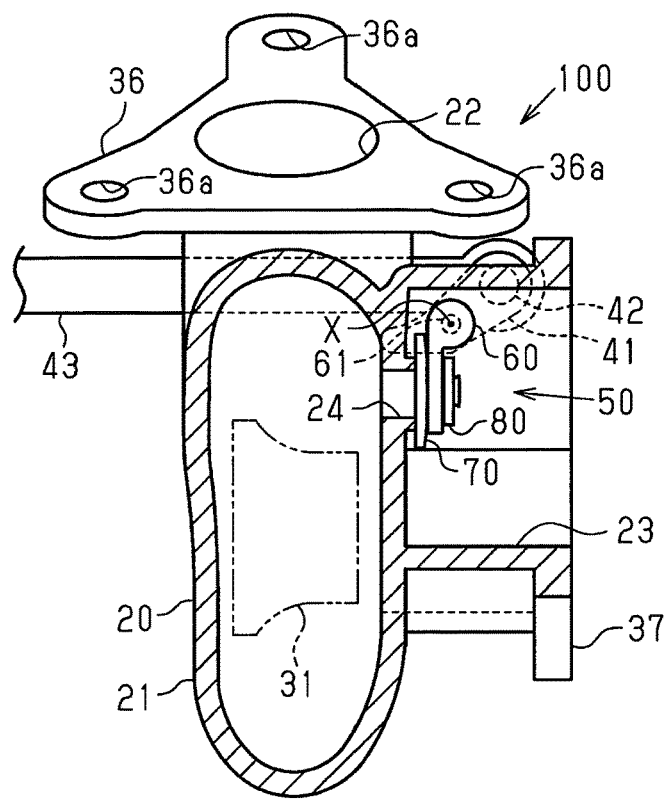
FIG. 2 is a cross-sectional view of a turbine housing of the turbocharger in FIG. 1.

As shown in FIG. 2, a housing body 21 of the turbine housing 20 accommodates a turbine wheel 31 including a substantially cylindrical circumferential surface from which a plurality of blades extend outward in a radial direction. The turbine wheel 31 is connected to a compressor wheel accommodated in the compressor housing 11 by a connection shaft accommodated in the bearing housing 12.

A scroll passage 22 defined inside a housing body 21 surrounds the turbine wheel 31 from an outer side in the radial direction. The scroll passage 22 is arcuate and extends around the center axis of the turbine wheel 31. An upstream flange 36 extends outward from an upstream end (upper end in FIG. 2) of the scroll passage 22 of the housing body 21. The upstream flange 36 includes bolt holes 36a. Bolts (not shown) are inserted into the bolt holes 36a of the upstream flange 36 to fix the turbine housing 20 to an exhaust passage at an upstream side of the turbine housing 20.

A discharge passage 23 connected to a downstream end of the scroll passage 22 is defined inside the housing body 21. The discharge passage 23 entirely extends along the center axis of the turbine wheel 31. A downstream flange 37 extends outward from the housing body 21 at a downstream end (right end in FIG. 2) of the discharge passage 23. The downstream flange 37 includes bolt holes (not shown). Bolts (not shown) are inserted into the bolt holes of the downstream flange 37 to fix the turbine housing 20 to an exhaust passage at a downstream side of the turbine housing 20.

Exhaust gas passing through the scroll passage 22 and blown toward the turbine wheel 31 is discharged from the turbine housing 20 through the discharge passage 23. The turbine wheel 31 of the turbocharger 100 is rotated when the exhaust gas passing through the scroll passage 22 is blown toward the turbine wheel 31. When the turbine wheel 31 is rotated, the compressor wheel is rotated with the connection shaft to compress the intake air.

A wastegate port 24 connecting an upstream portion of the scroll passage 22 relative to the turbine wheel 31 to the discharge passage 23 is defined inside the housing body 21. In this embodiment, the wastegate port 24 is a through-hole that extends through a wall partitioning the scroll passage 22 and the discharge passage 23. When the exhaust gas drawn into the scroll passage 22 passes through the wastegate port 24, the exhaust gas is allowed to bypass the turbine wheel 31 and flow from the scroll passage 22 to the discharge passage 23.

As shown in FIG. 2, the turbocharger 100 includes a wastegate valve 50 that opens and closes the wastegate port 24. The wastegate valve 50 is arranged inside the discharge passage 23 of the turbine housing 20. The wastegate valve 50 includes a swing arm 60, pivotally supported by the turbine housing 20, and a valve body 70 attached to the swing arm 60.

Figure 3:
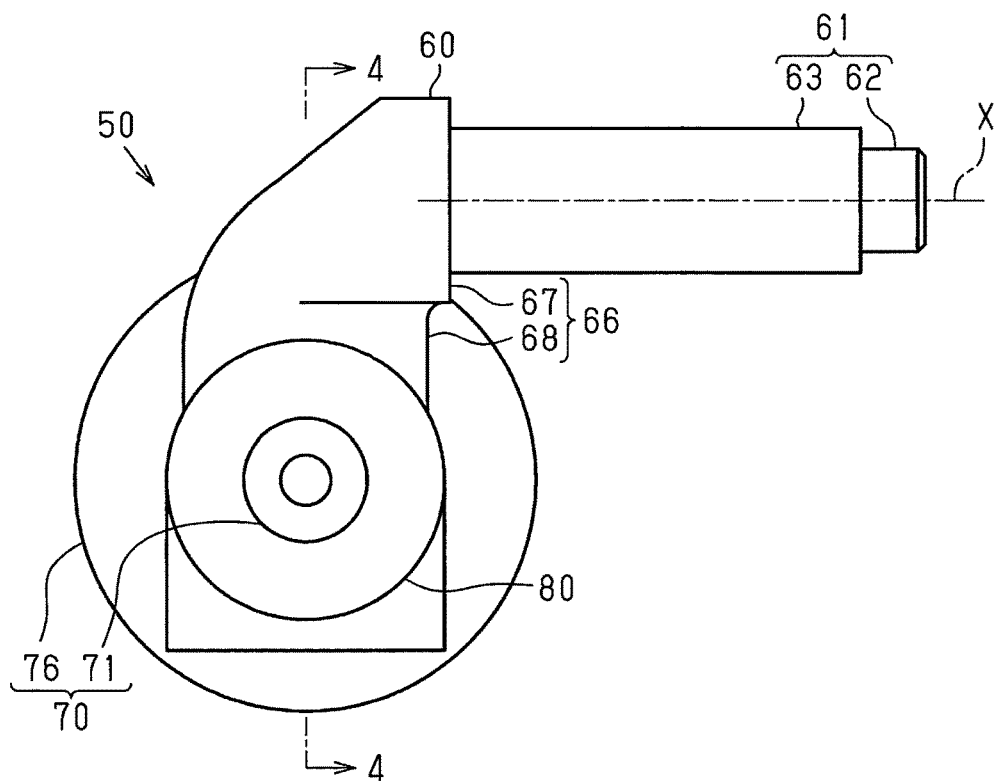
FIG. 3 is a plan view of a wastegate valve of the turbocharger in FIG. 1.

As shown in FIG. 3, the swing arm 60 includes a shaft 61 pivotally supported by the turbine housing 20. The shaft 61 includes a large diameter portion 63 having a substantially cylindrical shape and a small diameter portion 62 having a substantially cylindrical shape extending from an end of the large diameter portion 63. The large diameter portion 63 extends inside the housing body 21 of the turbine housing 20. The small diameter portion 62 extends through a wall of the housing body 21 and protrudes out of the outer surface of the housing body 21. The outer diameter of the large diameter portion 63 is larger than the outer diameter of the small diameter portion 62. The large diameter portion 63 and the small diameter portion 62 are coaxial.

The swing arm 60 includes a lever 66 extending from the end of the large diameter portion 63 at the side opposite to the small diameter portion 62. The lever 66 entirely extends radially outward from the large diameter portion 63. Specifically, the lever 66 includes a curved portion 67 that is curved perpendicularly to a center axis X of the shaft 61. A fixed portion 68 that is substantially quadrangular and flat extends from the curved portion 67. The fixed portion 68 extends in a direction orthogonal to the center axis X of the shaft 61 (vertical direction in FIG. 3).

Figure 4:
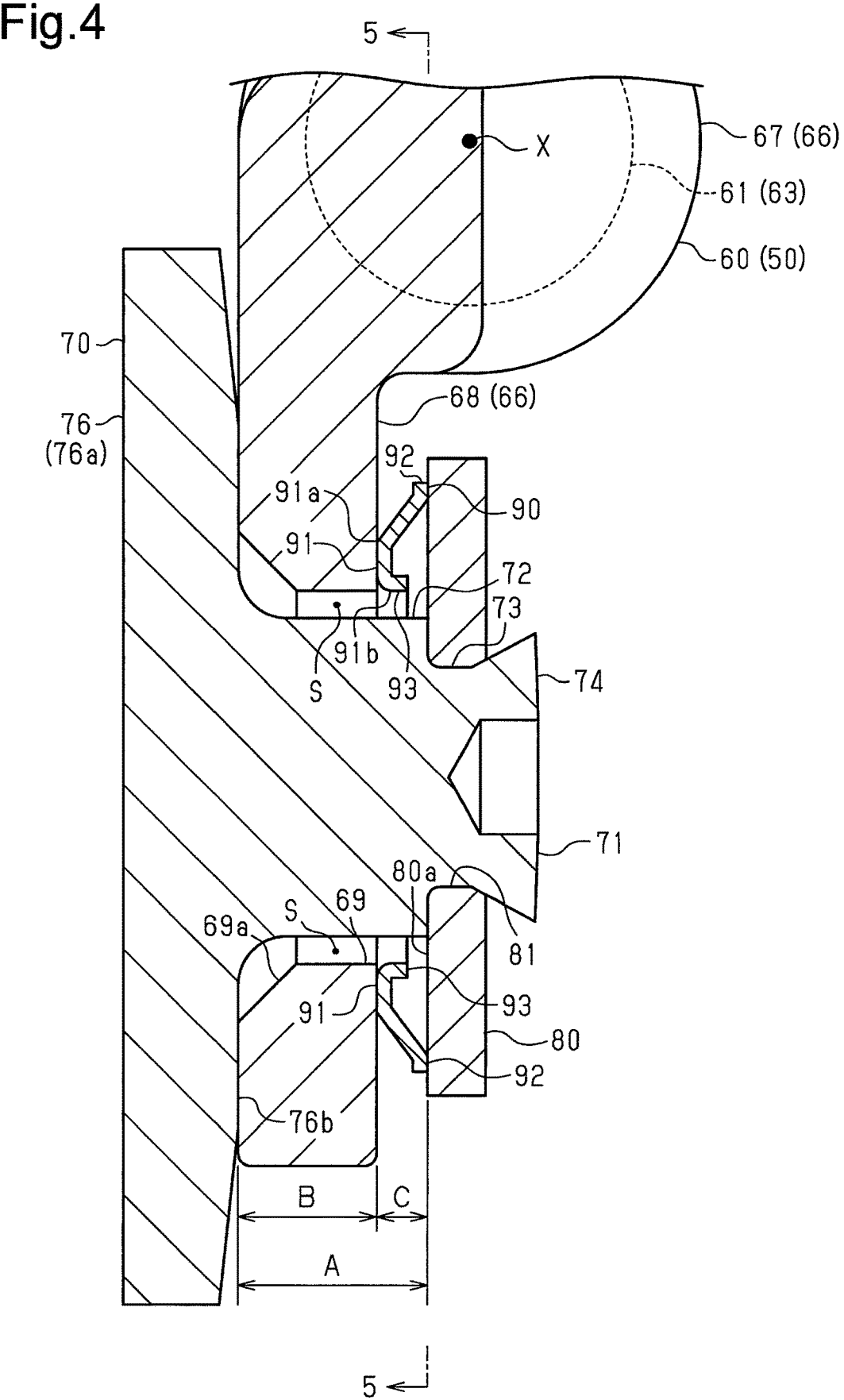
FIG. 4 is a cross-sectional view taken along line 4-4 in FIG. 3.
Figure 5:
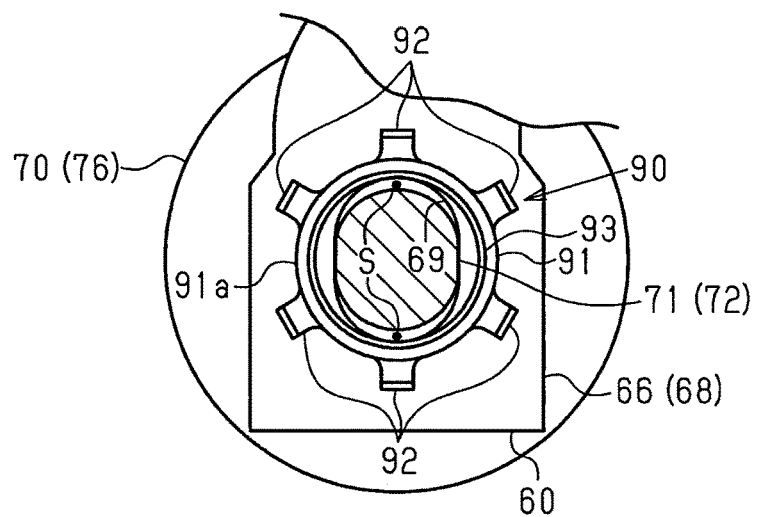
FIG. 5 is a cross-sectional view taken along line 5-5 in FIG. 4.

As shown in FIG. 5, an insertion hole 69 extends through a substantially central portion of the fixed portion 68 in the thickness-wise direction of the fixed portion 68. The insertion hole 69 is substantially elliptic. The major axis direction of the insertion hole 69 corresponds to a direction orthogonal to the center axis X of the shaft 61. In other words, the major axis direction of the insertion hole 69 corresponds to a direction in which the fixed portion 68 extends (vertical direction in the FIG. 5). As shown in FIG. 4, the fixed portion 68 includes an increased diameter surface 69a that partially forms the insertion hole 69 at one side of the fixed portion 68 in the thickness-wise direction (left side in FIG. 4). Specifically, the fixed portion 68 is chamfered to form the increased diameter surface 69a such that the inner diameter of the insertion hole 69 increases toward one side in the thickness-wise direction.

As shown in FIG. 4, the valve body 70 includes a valve shaft 71 inserted into the insertion hole 69 of the swing arm 60. Specifically, a large diameter portion 72 having a substantially cylindrical shape of the valve shaft 71 is inserted into the insertion hole 69. As shown in FIG. 5, the large diameter portion 72 is shaped as a slightly narrowed ellipse in a cross-sectional view orthogonal to the axial direction of the large diameter portion 72. The minor axis diameter of the large diameter portion 72 (dimension in the horizontal direction in FIG. 5) is slightly smaller than the minor axis diameter of the insertion hole 69. The major axis diameter of the large diameter portion 72 (dimension in the vertical direction in FIG. 5) is smaller than the major axis diameter of the insertion hole 69 as required. This provides a clearance S between the outer surface of the large diameter portion 72 and the edge of the insertion hole 69 in the major axis direction.

As shown in FIG. 4, one end of the large diameter portion 72 (right end in FIG. 4) protrudes out of the insertion hole 69. A small diameter portion 73 having a substantially cylindrical shape extends from the surface at the end of the large diameter portion 72 (right end surface in FIG. 4). The outer diameter of the small diameter portion 73 is smaller than the outer diameter of the large diameter portion 72. An increased diameter portion 74 having a substantially tapered shape extends from the distal end surface of the small diameter portion 73. The increased diameter portion 74 at the end continuous with the small diameter portion 73 has an outer diameter that is the same as the outer diameter of the small diameter portion 73. The outer diameter of the increased diameter portion 74 increases as the small diameter portion 73 becomes farther.

A valve plate 76 that is substantially disc-shaped extends from the other end surface of the large diameter portion 72 (left end surface in FIG. 4). The valve plate 76 and the large diameter portion 72 are coaxial. The outer diameter of the valve plate 76 is larger than the outer diameters of the large diameter portion 72 and the wastegate port 24. A surface of the valve plate 76 at the side opposite to the valve shaft 71 defines an abutting surface 76a. The abutting surface 76a abuts on an open end of the wastegate port 24 in a wall surface of the turbine housing 20 so that the valve plate 76 closes the wastegate port 24 and shifts the wastegate port 24 to a closed state. The abutting surface 76a of valve plate 76 moves away from the open end of the wastegate port 24 to shift the wastegate port 24 to an open state.

A support plate 80 that is substantially disc-shaped is fixed to the small diameter portion 73 and the increased diameter portion 74 of the valve shaft 71 at the side opposite to the valve plate 76. The outer diameter of the support plate 80 is larger than the inner diameter of the insertion hole 69 of the swing arm 60. A fixing hole 81 extends through a substantially central portion of the support plate 80 in the thickness-wise direction of the support plate 80. The inner diameter of the fixing hole 81 is substantially the same as the outer diameter of the small diameter portion 73. The support plate 80 is fixed to the valve shaft 71 by inserting the small diameter portion 73 and the increased diameter portion 74 of the valve shaft 71 into the fixing hole 81 and then bending the increased diameter portion 74.

As shown in FIG. 4, the support plate 80 and the valve plate 76 are substantially arranged in parallel. The support plate 80 includes an opposing surface 80a directed toward the valve plate 76. The valve plate 76 includes an opposing surface 76b directed toward the support plate 80. The opposing surface 80a of the support plate 80 and the opposing surface 76b of the valve plate 76 are opposed to each other. The lever 66 (i.e., fixed portion 68) of the swing arm 60 is arranged between the opposing surface 80a of the support plate 80 and the opposing surface 76b of the valve plate 76. Distance A between the opposing surface 80a of the support plate 80 and the opposing surface 76b of the valve plate 76 is larger than thickness B of the fixed portion 68 in the axial direction of the valve shaft 71. A clearance corresponding to distance C provided between the support plate 80 and the fixed portion 68 is set by subtracting the thickness B from the distance A in the axial direction of the valve shaft 71 in FIG. 4.

The valve body 70 is secured to the lever 66 in a tiltable manner. Specifically, as shown in FIGS. 4 and 5, the clearance S is provided between the edge of the insertion hole 69 and the outer surface of the large diameter portion 72 at the two major axis direction sides. This allows the center axis of the valve shaft 71 to tilt relative to the center axis of the insertion hole 69 of the lever 66. Specifically, the valve shaft 71 is allowed to swing in the major axis direction of the insertion hole 69 (vertical direction in FIG. 4). There is substantially no clearance between the edge of the insertion hole 69 and the outer surface of the large diameter portion 72 and at the two minor axis direction sides. This restricts swinging of the valve shaft 71 in the minor axis direction of the insertion hole 69.

As shown in FIG. 4, an elastic member 90 is arranged between the support plate 80 and the lever 66 (i.e., fixed portion 68). The elastic member 90 applies force to the support plate 80 to bias the valve body 70, which is secured to the support plate 80, toward a side opposite to the valve plate 76 in the axial direction of the valve shaft 71. In other words, the elastic member 90 biases the valve body 70 with the support plate 80 toward the right side in FIG. 4. As shown in FIG. 5, the elastic member 90 includes a ring 91 having a substantially annular shape. The inner diameter of the ring 91 is larger than the outer diameter of the large diameter portion 72 of the valve shaft 71 and is substantially the same as the major axis diameter of the insertion hole 69. The large diameter portion 72 of the valve shaft 71 is inserted into a central hole of the ring 91.

As shown in FIG. 5, claws 92 protrude outward from an outer circumferential edge 91a of the ring 91 in the radial direction of the ring 91. The claws 92 are substantially rectangular and flat. In the present embodiment, six claws 92 protrude from the ring 91. The claws 92 are arranged at equal angular intervals on the circumference of the ring 91.

As shown in FIG. 4, the claws 92 are curved toward the support plate 80 in the axial direction of the ring 91. That is, the claws 92 are curved toward the right side in FIG. 4. Before the elastic member 90 is coupled to the lever 66 of the swing arm 60, a curve length of each claw 92 is greater than the distance C obtained by subtracting the thickness B from the distance A. The curve length of each claw 92 refers to the length from the surface of the ring 91 facing the fixed portion 68 to the distal end of each claw 92 in the axial direction of the ring 91. After the elastic member 90 is coupled to the lever 66, the curve length of each claw 92 will be the same as the distance C. That is, when the elastic member 90 is coupled to the lever 66, the claws 92 are elastically deformed toward the fixed portion 68 in the axial direction of the ring 91. The claws 92 act to elastically return toward the support plate 80 and bias the valve body 70 with the support plate 80 in the axial direction of the ring 91.

As shown in FIG. 4, a projection 93 projects from an inner circumferential edge 91b of the ring 91 toward the support plate 80 in the axial direction of the ring 91. In other words, the projection 93 projects toward the right side in FIG. 4. In the present embodiment, the projection direction of the projection 93 corresponds to the axial direction of the ring 91. The projection 93 extends around the entire circumference of the ring 91 to form an annular shape. A projection length of the projection 93 refers to the length from the surface of the ring 91 facing the fixed portion 68 to the distal end of the projection 93 in the axial direction of the ring 91. The projection length is smaller than the distance C obtained by subtracting the thickness B from the distance A. In other words, when the valve body 70 is not tilted relative to the lever 66, the projection length of the projection 93 is smaller than the curve length of each claw 92 in the axial direction of the ring 91 as shown in FIG. 4.

The elastic member 90 allows the valve body 70 to be tilted relative to the lever 66 when the wastegate valve 50 closes the wastegate port 24. The elastic member 90 is designed and its materials are selected to reduce vibration of the valve body 70 that may occur when the wastegate valve 50 closes the wastegate port 24 or when exhaust gas strikes against the valve plate 76.

As shown in FIG. 1, a substantially flat first link arm 41 is secured to the shaft 61 (i.e., small diameter portion 62) of the wastegate valve 50 outside the turbine housing 20. A first connecting pin 42 having a substantially cylindrical shape is secured to the first link arm 41 at a location separated from the shaft 61. One end of a driving rod 43, which is entirely rod-shaped, is connected to the first connecting pin 42. A second connecting pin 44 having a substantially cylindrical shape is secured to the other end of the driving rod 43. A substantially flat second link arm 45 is secured to the second connecting pin 44. A rotary shaft 46 having a substantially cylindrical shape is fixed to the second link arm 45 at a location separated from the second connecting pin 44. The rotary shaft 46 extends through the wall of the compressor housing 11 into the compressor housing 11. The rotary shaft 46 is connected to the output shaft of an electric motor 47 arranged inside the compressor housing 11.

The operation and advantages of the present embodiment will now be described.

As shown in FIGS. 1 and 2, when the wastegate valve 50 opens or closes the wastegate port 24, a controller drives the electric motor 47. When the output shaft of the electric motor 47 is driven, the rotary shaft 46 is driven to drive the second link arm 45 around the rotary shaft 46. This drives the driving rod 43 with the second connecting pin 44, which in turn drives the first link arm 41 with the first connecting pin 42. Then, the shaft 61 (i.e., small diameter portion 62) of the wastegate valve 50 secured to the first link arm 41 is driven. This pivots the wastegate valve 50 about the center axis X of the shaft 61 and opens or closes the wastegate port 24.

As shown in FIG. 2, when the wastegate valve 50 closes the wastegate port 24, the abutting surface 76a of the valve plate 76 abuts on the wall surface of the turbine housing 20. The valve body 70 is tilted accordingly relative to the lever 66. The claws 92 of the elastic member 90 are elastically deformed so that the abutting surface 76a of the valve plate 76 is brought into close contact with the wall surface of the turbine housing 20. As a result, the abutting surface 76a of the valve body 70 closes the wastegate port 24 and shifts the wastegate port 24 to a closed state.

The wastegate valve 50 opens and closes the wastegate port 24 while being exposed to high-temperature exhaust gas drawn into the discharge passage 23 of the turbine housing 20. The claws 92 of the elastic member 90 of the wastegate valve 50 repeatedly undergo elastic deformation in such a high-temperature environment. Thus, the claws 92 of the elastic member 90 are susceptible to wear that deteriorates the resiliency of the claws 92. If the wear of the claws 92 causes the curve length of each claw 92 to be less than the distance C, the elastic member 90 cannot bias the valve body 70 in a state in which the valve body 70 is not tilted relative to the lever 66. Specifically, a gap is formed between the elastic member 90 and the support plate 80 or between the elastic member 90 and the lever 66 (i.e., fixed portion 68). The gap may loosen the wastegate valve 50. If the wastegate valve 50 is over-loosened, the wastegate valve 50 may generate noise when the wastegate valve 50 opens or closes the wastegate port 24 or when exhaust gas strikes the wastegate valve 50.

In contrast, in the present embodiment, the elastic member 90 includes the projection 93 as shown in FIG. 4. Thus, even if the wear of the claws 92 of the elastic member 90 causes the curve length of each claw 92 to be less than the projection length of the projection 93 in the axial direction of the ring 91, the thickness of the entire elastic member 90 will still be obtained by the projection length of the projection 93. Thus, the over-loosening of the wastegate valve 50 is limited as compared with when the elastic member 90 does not include the projection 93. This reduces noise generated by the wastegate valve 50 that would be caused by loosening of the wastegate valve 50.

In a case that differs from the present embodiment, if the projection length of the projection 93 in the axial direction of the ring 91 were to be the same as the distance C obtained by subtracting the thickness B from the distance A, the projection distal end of the projection 93 will abut on the support plate 80 and the ring 91 of the elastic member 90 will abut on the lever 66 (i.e., fixed portion 68) of the swing arm 60. Thus, the ring 91 and the projection 93 of the elastic member 90 may limit titling of the valve body 70 relative to the lever 66 in the wastegate valve 50.

In contrast, in the present embodiment, the projection length of the projection 93 in the axial direction of the ring 91 is less than the distance C obtained by subtracting the thickness B from the distance A. This avoids a situation in which the ring 91 abuts on the lever 66 (i.e., fixed portion 68), and the projection 93 abuts on the support plate 80. Thus, in the present embodiment, the ring 91 and the projection 93 are less likely to limit the tilting of the valve body 70 relative to the lever 66 compared with the case in which the projection length of the projection 93 is the same as the distance C.

In the present embodiment, the projection 93 of the elastic member 90 extends around the entire circumference of the ring 91 in an annular shape. Thus, the rigidity of the projection 93 according to the present embodiment is greater than when the projection 93 of the elastic member 90 is arranged around the ring 91 in a non-continuous manner. Thus, if the wear of the claws 92 causes the support plate 80 to abut on the projection 93 of the elastic member 90, the projection 93 will resist deformation. This ensures that the thickness of the elastic member 90 will be maintained in the present embodiment.

In the present embodiment, before the elastic member 90 is coupled to the lever 66 of the swing arm 60, the curve length of each claw 92 in the axial direction of the ring 91 is greater than the distance C obtained by subtracting the thickness B from the distance A. When the elastic member 90 is coupled to the lever 66, the claws 92 are elastically deformed in the axial direction of the ring 91 to bias the valve body 70 with the support plate 80. Thus, in the present embodiment, the wastegate valve 50 is less likely to loosen before the claws 92 are worn. Further, the wastegate valve 50 is not over-loosened after the claws 92 are worn. As a result, the present embodiment reduces noise generated by the wastegate valve 50 that would be caused by loosening of the wastegate valve 50 before and after wear of the claws 92 of the elastic member 90.

In the present embodiment, the claws 92 of the elastic member 90 protrude outward from the outer circumferential edge 91a of the ring 91 in the radial direction of the ring 91. Further, the projection 93 of the elastic member 90 also projects from the inner circumferential edge 91b of the ring 91. When the valve body 70 is tilted relative to the lever 66 (i.e., fixed portion 68), the amount of movement relative to the lever 66 (i.e., fixed portion 68) increases toward radially outer portions of the valve body 70, and the amount of movement relative to the lever 66 (i.e., fixed portion 68) decreases toward radially inner portions of the valve body 70. Thus, in the present embodiment, before the claws 92 of the elastic member 90 are worn, elastic deformation of the claws 92 positioned outward in the radial direction will not be limited by the projection 93 located at a radially inner position. That is, the projection 93 located at a radially inner position is less likely to limit elastic deformation of the claws 92 than when the projection 93 is located at a radially outer position.

The present embodiment may be modified as described below. The present embodiment and modifications may be implemented in combination as long as there are no technical contradictions.

Figure 6:
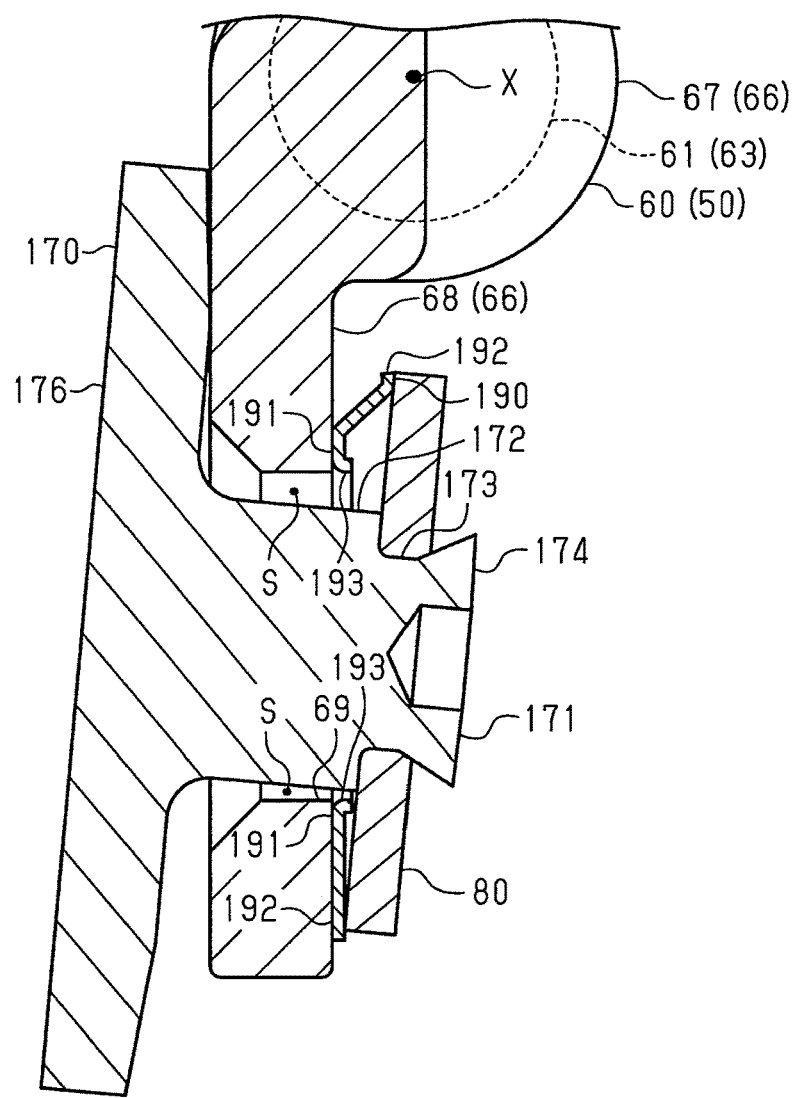
FIG. 6 is a cross-sectional view of a wastegate valve according to a modification.

In the above embodiment, the projection length of the projection of the elastic member may be changed where necessary. As shown in FIG. 6, for example, the projection length of the projection 193 is designed such that the distal end of the projection 193 does not abut on the support plate 80 when the center axis of the valve shaft 171 is most tilted relative to the center axis of the insertion hole 69 of the lever 66. In the example shown in FIG. 6, when a valve body 170 is most tilted relative to the lever 66, an upper side portion of a valve plate 176 abuts on the lever 66 (i.e., fixed portion 68). As shown in FIG. 6, a lower side portion of the support plate 80 presses a claw 192 against the lever 66 to elastically deform the claw 192. In other words, a certain claw 192 (lower claw 192 in FIG. 6) among a plurality of claws 192 of an elastic member 190 is most elastically deformed, and the claw 192 is arranged to be substantially flush with a ring 191. The projection length of the projection 193 is set such that the projection distal end of the projection 193 does not abut on the support plate 80 even when the claw 192 of the elastic member 190 is most elastically deformed and the valve body 170 is most tilted relative to the lever 66 as described above. Thus, when the valve body 170 is tilted relative to the lever 66, the tilting is not restricted by the projection 193. As a result, the tilting of the valve body 170 relative to the lever 66 is not restricted and over-loosening of the wastegate valve 50 does not occur.

If the difference is small between the major axis diameter of the insertion hole 69 of the lever 66 and the major axis diameter of a large diameter portion 172 of the valve shaft 171, the tilting of the valve body 170 relative to the lever 66 may be restricted by abutment between the lever 66 and the valve shaft 171 before the claw 192 is most elastically deformed. In this case, when the tilting of the valve body 170 relative to the lever 66 is restricted by the abutment between the lever 66 and the valve shaft 171, the center axis of the valve shaft 171 is most tilted relative to the center axis of the insertion hole 69 of the lever 66.

As long as the loosening of the wastegate valve 50 is within a tolerable range, the curve length of each claw 92 may be less than or equal to the distance C obtained by subtracting the thickness B from the distance A before the elastic member 90 is coupled to the lever 66. Specifically, when the valve body 70 is tilted relative to the lever 66, the distance between the lever 66 (i.e. fixed portion 68) and the support plate 80 may be less than the curve length of each claw 92 before the elastic member 90 is coupled to the lever 66. This allows the elastic member 90 to bias the valve body 70 in the axial direction of the valve shaft 71.

The claws 92 of the elastic member 90 may protrude inward from the inner circumferential edge 91b of the ring 91 in the radial direction of the ring 91. In this case, the claws 92 can bias the valve body 70 as long as the projection length of the projection 93 is less than the curve length of each claw 92.

The projection 93 of the elastic member 90 may protrude from the outer circumferential edge 91a of the ring 91. In this case, the claws 92 can bias the valve body 70 as long as the projection length of the projection 93 is smaller than the curve length of each claw 92.

A direction in which the elastic member 90 is coupled to the lever 66 (i.e., fixed portion 68) may be changed where necessary. Specifically, the claws 92 of the elastic member 90 may be curved toward the lever 66 (i.e., fixed portion 68) in the axial direction of the ring 91, and the projection 93 of the elastic member 90 may project toward the lever 66 (i.e., fixed portion 68) in the axial direction of the ring 91

Figure 7:
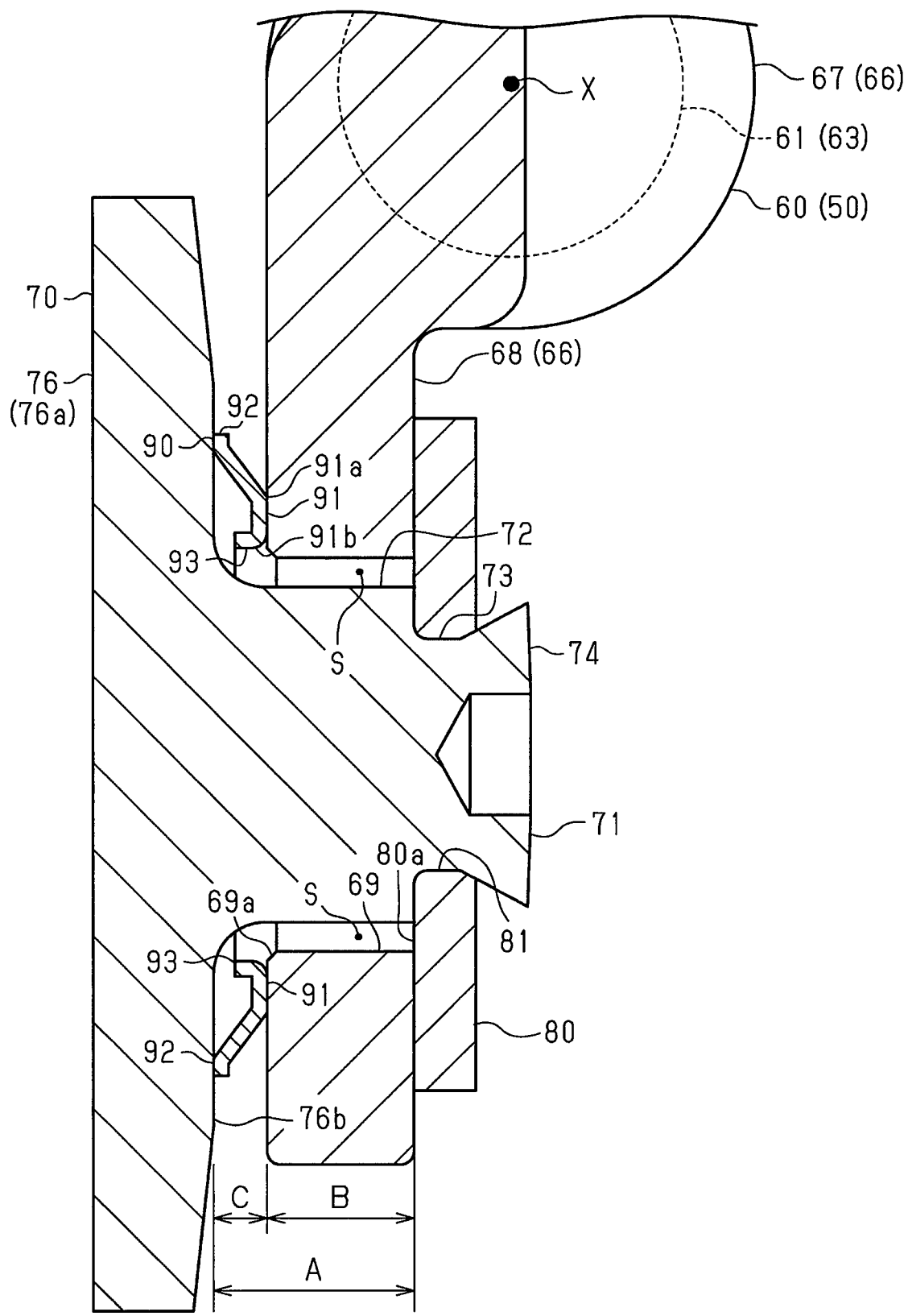
FIG. 7 is a cross-sectional view of a wastegate valve according to another modification.

As shown in FIG. 7, the elastic member 90 may be arranged between the lever 66 (i.e., fixed portion 68) and the valve plate 76. In this case, chamfering of the increased diameter surface 69a of the lever 66 may be reduced such that the ring 91 and the projection 93 respectively abut on the lever 66 (i.e., fixed portion 68) and the valve plate 76 when the valve body 70 is tilted relative to the lever 66.

In the modification of FIG. 7, the elastic member 90 biases the valve body 70 toward a side opposite to the support plate 80 in the axial direction of the valve shaft 71. That is, in the modification and the above embodiment, the elastic member 90 biases the valve body 70 in the axial direction of the valve shaft 71.

Figure 8:
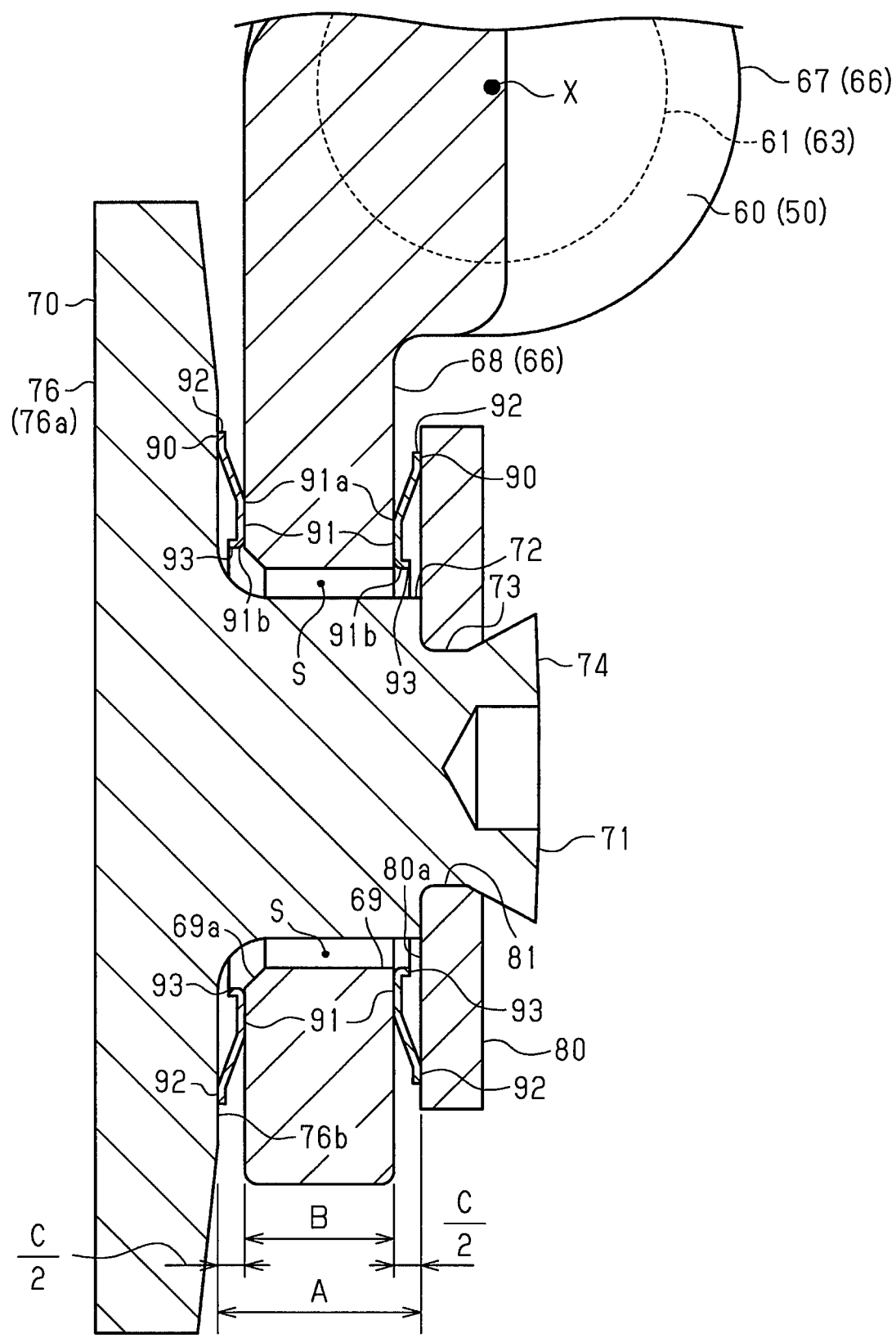
FIG. 8 is a cross-sectional view of a wastegate valve according to a further modification.

As shown in FIG. 8, two elastic members 90 may each be arranged between the support plate 80 and the lever 66 and between the lever 66 and the valve plate 76. In this case, the total projection length of the projections 93 of the two elastic members 90 may be smaller than the distance C obtained by subtracting the thickness B from the distance A in the axial direction of the ring 91.

The shape of the ring 91 of the elastic member 90 may be changed where necessary. The ring 91 may have a substantially elliptic-annular shape, for example.

The shape of the projection 93 of the elastic member 90 may be changed where necessary. For example, if the rigidity of the projection 93 is sufficiently high, the projection 93 may be arranged in a non-continuous manner around the ring 91. Further, the projection 93 may be partially arranged around the ring 91.

The valve body 70 does not need to be tiltable relative to the lever 66. For example, when the wastegate valve 50 closes the wastegate port 24, the valve body 70 may move only in the axial direction of the valve shaft 71 even if the abutting surface 76a of the valve body 70 does not abut on the wall surface of the turbine housing 20 as long as the abutting surface 76a of the valve body 70 is brought into close contact with the wall surface of the turbine housing 20. In this case, the major axis diameter of the large diameter portion 72 of the valve shaft 71 may be slightly smaller than the major axis diameter of the insertion hole 69.

In the above embodiment, the number and arrangement of the claws 92 of the elastic member 90 may be changed where necessary. For example, the number of the claws 92 may be less than or equal to five or greater than or equal to seven as long as the claws 92 of the elastic member 90 can bias the valve body 70. The claws 92 of the elastic member 90 do not need to be arranged at equal angular intervals.

Therefore, the present examples and embodiments are to be considered as illustrative and not restrictive and the invention is not to be limited to the details given herein, but may be modified within the scope and equivalence of the appended claims.

The invention claimed is:

1. A wastegate valve of a turbocharger, wherein the turbocharger includes a turbine housing that includes a wastegate port, the wastegate valve comprising:

a swing arm that includes a shaft configured to be pivotally supported by the turbine housing and a lever extending outward from an end of the shaft in a radial direction of the shaft and including an insertion hole;

a valve body attached to the swing arm, wherein the valve body includes a valve shaft inserted into the insertion hole and a valve plate arranged on an end of the valve shaft, and the valve plate is configured to abut on an open end of the wastegate port in an inner surface of the turbine housing to close the wastegate port;

a support plate fixed to a portion of the valve shaft protruding out of the insertion hole at a side opposite to the valve plate; and an elastic member arranged between the support plate and the lever or the lever and the valve plate and configured to bias the valve body in an axial direction of the valve shaft, wherein the elastic member includes a ring into which the valve shaft is inserted, a plurality of claws protruding from the ring in a radial direction of the ring and curved toward a first side in an axial direction of the ring, and a projection projecting from the ring toward the first side in the axial direction of the ring, wherein a length from a surface of the ring located at a second side in the axial direction of the ring to a distal end of the projection is referred to as a projection length of the projection, and the projection length of the projection is smaller than a distance obtained by subtracting a thickness of the lever from a distance between the valve plate and the support plate in the axial direction of the valve shaft.

2. The wastegate valve of a turbocharger according to claim 1, wherein the projection extends entirely around a circumference of the ring in an annular shape.

3. The wastegate valve of a turbocharger according to claim 1, wherein a length from the surface of the ring located at the second side in the axial direction of the ring to a distal end of each claw is referred to as a curve length of each claw, and the curve length of each claw is larger than the distance obtained by subtracting the thickness of the lever from the distance between the valve plate and the support plate in the axial direction of the valve shaft before the elastic member is coupled to the lever.

4. The wastegate valve of a turbocharger according to claim 1, wherein the valve body is secured to the lever in a manner tiltable relative to the lever, the plurality of claws protrude outward from an outer edge of the ring in the radial direction of the ring, and the projection projects from an inner edge of the ring in the radial direction of the ring.

5. The wastegate valve of a turbocharger according to claim 1, wherein the valve body is secured to the lever in a manner tiltable relative to the lever, the plurality of claws protrude outward from the ring in the radial direction of the ring, and the projection length of the projection is set such that the distal end of the projection does not abut on the support plate, the lever, or the valve plate when a center axis of the valve body is most tilted relative to a center axis of the insertion hole.

6. The wastegate valve of a turbocharger according to claim 1, wherein the elastic member is a first elastic member arranged between the support plate and the lever, and the wastegate valve further comprises a second elastic member arranged between the lever and the valve plate.

* * * * *